(12) United States Patent
Shaw et al.

(10) Patent No.: US 8,024,667 B2
(45) Date of Patent: Sep. 20, 2011

(54) IN-DOCUMENT FLOATING OBJECT RE-ORDERING

(75) Inventors: Han-Yi Shaw, Redmond, WA (US); Brent Lang, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 146 days.

(21) Appl. No.: 12/258,074

(22) Filed: Oct. 24, 2008

(65) Prior Publication Data

US 2010/0107101 A1    Apr. 29, 2010

(51) Int. Cl.
*G06F 17/00* (2006.01)
*G06F 3/048* (2006.01)

(52) U.S. Cl. ........ 715/766; 715/243; 715/768; 715/769; 715/790; 715/782

(58) Field of Classification Search .................. 715/766, 715/782, 862, 790, 768, 769, 243, 794, 795, 715/796, 848, 849, 850, 851, 852
See application file for complete search history.

(56) References Cited

U.S. PATENT DOCUMENTS

| | | | | |
|---|---|---|---|---|
| 5,497,454 A * | 3/1996 | Bates et al. | .................... | 715/799 |
| 5,689,666 A * | 11/1997 | Berquist et al. | ............... | 715/797 |
| 5,880,733 A * | 3/1999 | Horvitz et al. | ................ | 715/850 |
| 6,040,833 A * | 3/2000 | Henshaw | ...................... | 715/794 |
| 6,577,330 B1 * | 6/2003 | Tsuda et al. | .................. | 715/782 |
| 6,583,798 B1 | 6/2003 | Hoek et al. | | |
| 6,606,105 B1 * | 8/2003 | Quartetti | ....................... | 715/853 |
| 7,068,288 B1 * | 6/2006 | Good et al. | .................... | 345/619 |
| 7,187,389 B2 | 3/2007 | Redpath et al. | | |
| 7,197,710 B2 | 3/2007 | Faraday et al. | | |
| 7,265,762 B2 | 9/2007 | Purdy | | |
| 7,330,192 B2 | 2/2008 | Brunner et al. | | |
| 7,400,322 B1 | 7/2008 | Urbach | | |
| 7,439,975 B2 * | 10/2008 | Hsu | ............................... | 345/426 |
| 7,557,804 B1 * | 7/2009 | McDaniel | ..................... | 345/427 |
| 2002/0140736 A1 * | 10/2002 | Chen | ............................. | 345/777 |
| 2005/0204306 A1 * | 9/2005 | Kawahara et al. | ............. | 715/782 |
| 2006/0036971 A1 * | 2/2006 | Mendel et al. | ................. | 715/856 |
| 2007/0126732 A1 * | 6/2007 | Robertson et al. | ............ | 345/419 |
| 2007/0288863 A1 | 12/2007 | Ording et al. | | |

OTHER PUBLICATIONS

Application Architecture for .Net: Designing Applications and Services, MSDN, Dec. 2002, http://msdn.microsoft.com/en-us/library/ms978348,aspx. UIGraphics: Specifications: Graphic Types, Eclipsepedia, last modified Dec. 2007, http://wiki.eclipse.org/UIGraphics_:_Specifications_:_GraphicTypes.

Enhanced Frame and Iframe Support, Internet Explorer Chapter 11-The Microsoft DHTML Platform, Copyright Microsoft 2008, 12 pages, http://www.microsoft.com/technet/prodtechnol/ie/reskit/6/part3/c11ie6rk.mspx?mfr=true.

* cited by examiner

*Primary Examiner* — Kieu Vu
*Assistant Examiner* — Blaine T. Basom
(74) *Attorney, Agent, or Firm* — Vierra Magen Marcus & DeNiro LLP

(57) ABSTRACT

Techniques are disclosed herein for re-ordering floating objects in an electronic document. An electronic document having floating objects is displayed in a first mode. Each floating object has an x-y location in the document and has a position on a z-order stack. In the first mode the floating objects are displayed in an x-y plane based on the z-order stack. Then, the electronic document is displayed in a second mode in which the electronic document is depicted as x-y plane slices. Each x-y plane slice corresponds to one position on the z-order stack. The x-y plane slices are displayed in particular order to depict the position of the floating objects on the z-order stack. A re-ordering of the x-y plane slices is displayed based on a request. Then, the electronic document is displayed in the first mode again based on the re-ordering of the x-y planes.

19 Claims, 9 Drawing Sheets

IN-DOCUMENT FLOATING OBJECT RE-ORDERING

BACKGROUND

Conventional document processing applications provide users the ability to insert various types of objects into electronic documents under creation or maintenance. The objects represent any form of data and include, for example, graphics, tables, icons, graphs and other electronic documents (e.g., spreadsheets, word processing documents, etc.). One type of object is what may be referred to as a "floating object".

A floating object (e.g., pictures, shapes, textboxes) is an object that is not tied to any particular layer in an electronic document. The floating objects typically occupy different layers of a "z-order stack", which determines which floating object to render "over" another when they overlap in the x-y plane". Thus, a given page of an electronic document may be divided into many layers.

Manipulating floating objects often becomes difficult if one or more floating objects are behind other floating objects. This is a common problem for page layout applications since layout-rich documents typically have many floating objects. Some software applications have commands such as "move to back" and "send to front" to allow manipulation of the floating objects. However, if a floating object is completely obscured by another floating object, the user may not even be aware of the obscured floating object. The user may drag overlying object(s) out of the way to look for and get at the obscured floating object such that the user can edit the now uncovered floating object. However, the user may not even be aware of the existence of the obscured floating object. Moreover, the user may have a difficult time returning the moved floating object back to its original location. With some editing programs, even if a floating object is not completely obscured, it is difficult for a user to select the underlying floating object to edit it. Thus, it can be very frustrating for a user to edit a document with floating objects.

SUMMARY

Techniques are disclosed herein for providing an intuitive means for users to quickly view and manipulate the relative order of floating objects in different layers of a document page being edited in a software application. A special layer editing mode is provided that allows the user to change the relative ordering of floating objects. However, the layer editing mode does not necessarily allow other editing of the floating objects such as changes to size, color or formatting. The user is allowed to chose whether all floating objects in the document page or only a subset of floating objects (such as overlapping floating objects) appear in the layer editing mode. In the layer editing mode, the document page is divided into different slices, each of which corresponds to one of the layers of the document. The slices are displayed in a way that indicates the order of the layers. In one aspect, the slices are tagged with descriptors (e.g., numerals) to provide dynamic visual feedback as the user changes the order of the layers. Moreover, the descriptors provide useful feedback on the total number of available layers in the document page.

One aspect is a method of re-ordering floating objects in an electronic document. In this aspect, an electronic document is displayed in a first mode. The electronic document comprises floating objects and a z-order stack. Each floating object has an x-y location in the document and has a position on the z-order stack. In the first mode the floating objects are displayed in a single x-y plane based on the z-order stack. Then, the electronic document is displayed in a second mode. In one implementation, the electronic document is displayed in the second mode in response to a user request to enter the second mode. In the second mode, the electronic document is depicted as x-y plane slices. Each x-y plane slice corresponds to one position on the z-order stack and depicts the floating object that is associated with that position on the z-order stack. The x-y plane slices are displayed in particular order to depict the position of the floating objects on the z-order stack. A request to re-order the x-y plane slices is received when in the second mode. A re-ordering of the x-y plane slices based on the request is displayed. Then, the electronic document is displayed in the first mode again based on the re-ordering of the x-y plane slices. In one aspect, the electronic document is displayed in the first mode in response to a user request.

In another aspect, a selection of one of the floating objects is received while displaying the electronic document in the first mode. A subset of floating objects that are associated with the selected floating object is determined. For example, floating objects that overlap the selected floating object are determined. When displaying the electronic document in the second mode, only x-y plane slices that contain a member of the subset of floating objects are displayed.

In another aspect, an option is provided for a user to request that all of the floating objects be displayed in the layer editing mode or that only floating objects that overlap a selected floating object be displayed in the layer editing mode.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
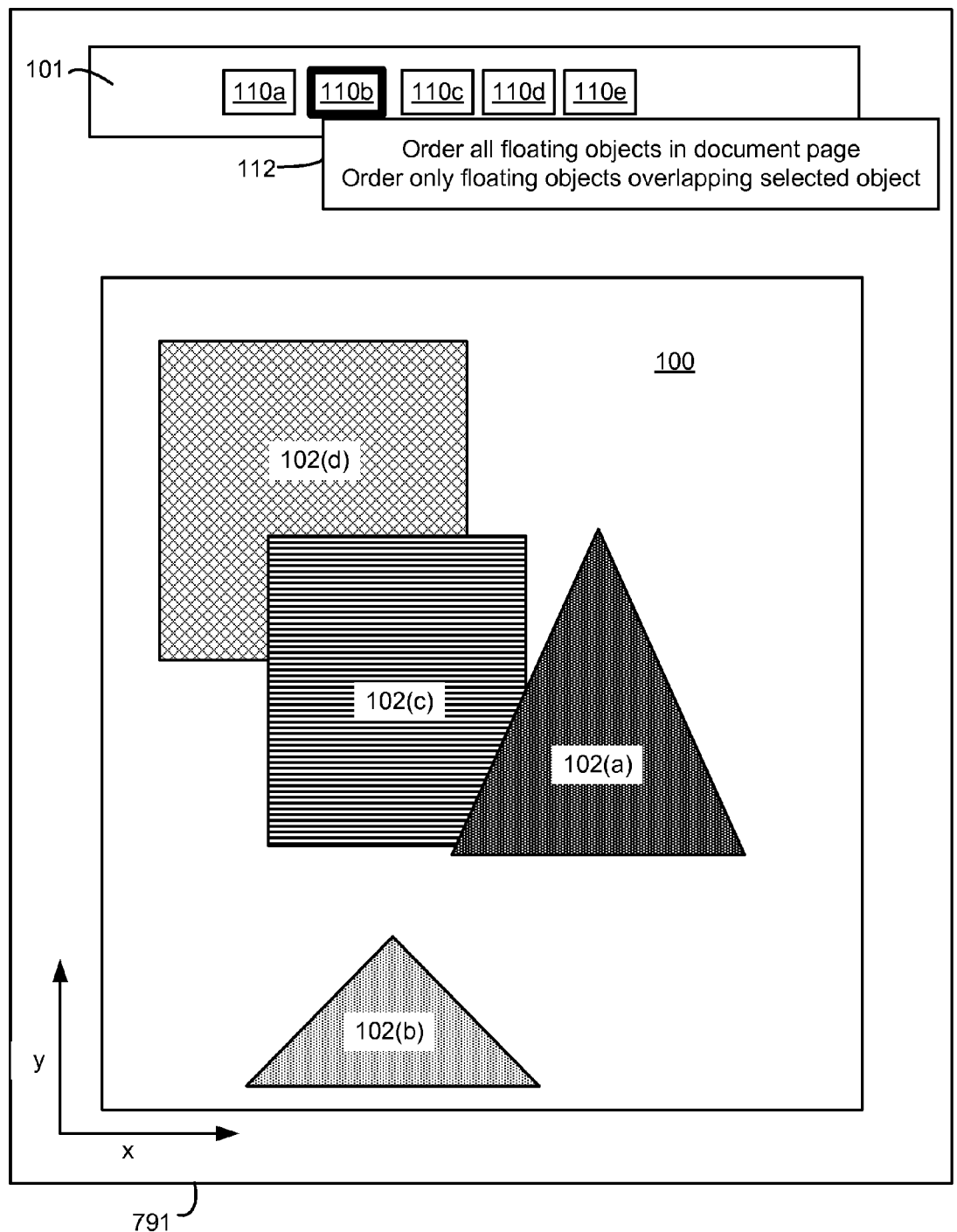
FIG. 1 depicts a page of a document with several floating objects in one embodiment of an editing mode.

FIG. 1 depicts a page 100 of an electronic document being displayed on a display screen 791 in a "normal" editing mode of a software application. The document page 100 has several floating objects 102(a)-102(d). As examples, the floating objects 102 could be text boxes, pictures, shapes, etc. For purposes of discussion, the document page 100 will be described as having an x-axis and a y-axis that define an x-y plane. Hence, a floating object 102 has an x-y location, which refers to the space it occupies in the x-y plane. That is, a floating object 102 has boundaries in the x-y plane. Each of the floating objects 102 has a position on a z-order stack. A position on the z-order stack will also be referred to herein as a "layer". The z-order stack position determines which floating object 102 is rendered over top of another when they at least partially overlap. For example, floating object 102(*a*) is rendered over top of floating object 102(*c*), which in turn is rendered over top of floating object 102(*d*). Thus, floating object 102(*a*) is at a higher position on the z-order stack than floating object 102(*c*).

In general, a floating object 102 may have any degree of transparency (or alternatively opaqueness). Therefore, a floating object 102 does not necessary completely obscure an overlapping floating object 102 at a lower position on the z-order stack. However, the rendering of the intersection of the two floating objects 102 may be adjusted to account for the overlapping.

The document 100 is being rendered in a "normal" editing mode of the software application in which floating objects 102 are depicted in the same x-y plane based on their relative positions on the z-order stack. The software application may be any editing program that allows floating objects at different layers. For example, the software application could be used for word processing, creating slide presentations, creating electronic drawings, editing photographs, etc. The normal editing mode allows the user to add, remove, or move floating objects 102, as well as to change characteristics of the floating objects 102. Examples of changing the characteristics include changing the size, shape, color, transparency, etc. The x-y position of the floating objects 102 can be changed by, for example, dragging the floating object 102 with a cursor. The normal editing mode may also allow the user to change the position of a floating object 102 on the z-order stack with a command such as "move to back" or "move to front". However, it is not required that the position on the z-order stack be editable in the normal editing mode.

FIG. 1 also depicts is a toolbar 101 having numerous icons 110*a*-110*e* for editing the document page 100. One of the icons 110*b* allows the user to cause a layer editing mode to be invoked. The layer editing mode provides a convenient user interface to re-order the layers of floating objects 102. If the user "clicks" on icon 110*b* a menu 112 appears. The menu 112 allows the user to select between having all the floating objects 102 appear in the layer editing mode (order all floating objects in document page) or having only floating objects 102 that overlap a selected floating object 102 to appear in the layer editing mode (order only floating objects overlapping selected object). Thus, the user can have the layer editing mode focus on a more interesting group of floating objects 102.

In one aspect, each of the floating objects 102 occupies a limited range in the x-y plane of the document page 100. For example, the boundaries of floating object 102(*a*) might be the region of the triangle. However, it is not required that the boundaries of a floating object 102 be based strictly on visible boundaries. For example, the boundaries of floating object 102(*a*) could be defined as the smallest rectangle into which the triangle completely fits. The boundaries can be defined in any convenient manner. For example, if the document page 100 is laid out in a grid of x inches by y inches, then each floating object 102 can have its boundaries defined based on the grid. As another alternative, the document page 100 might be specified as a grid of x pixels by y pixels, in which case a floating object's boundaries may be defined by pixel location. Other techniques might also be used to specify the boundaries.

Two floating objects 102 are said to "overlap" if any part of their x-y boundaries intersect each other. For example, floating object 102(*a*) and 102(*c*) overlap, as do floating objects 102(*c*) and 102(*d*). In one aspect, a determination is made as to which floating objects overlap a selected floating object. Following are two different ways of determining floating objects that overlap a selected floating object. A first technique looks only for those floating objects that directly overlap the selected floating object. For example, floating object 102(*c*) directly overlaps floating object 102(*d*). The first technique will be referred to herein as the "directly overlapping technique". A second technique looks for a set of floating objects in a "cluster" that includes the selected floating object (such as object 102(*d*)). For example, floating object 102(*c*) overlaps floating object 102(*d*) making floating object 102(*c*) a part of the cluster. Moreover, floating object 102(*a*) overlaps floating object 102(*c*) making floating object 102(*a*) a part of the cluster even though floating object 102(*a*) does not directly overlap floating object 102(*d*). The second technique will be referred to herein as the "cluster technique."

Figure 2:
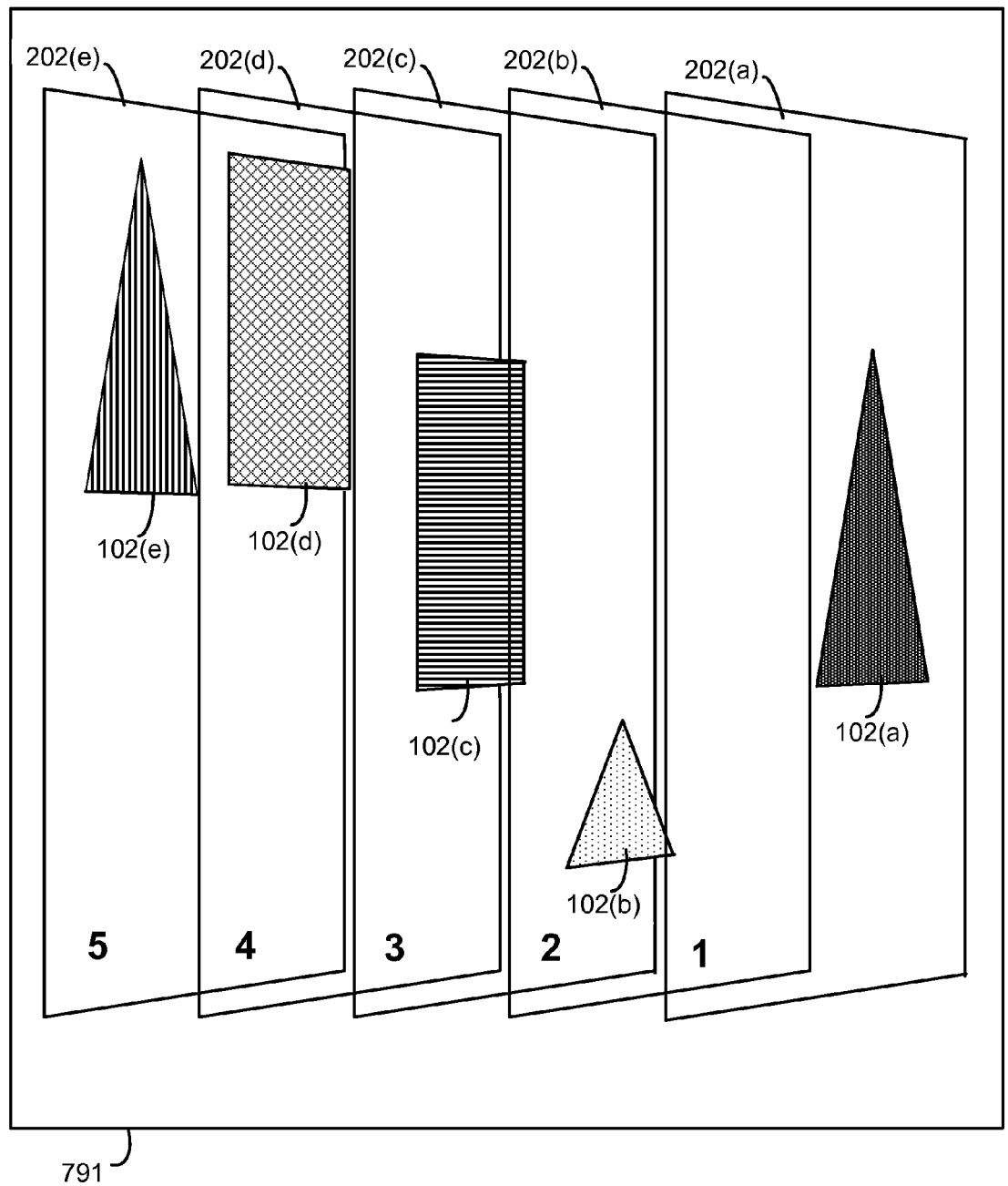
FIG. 2 depicts a document page being rendered in one embodiment of a layer editing mode.

Four floating objects 102(*a*)-102(*d*) are visible in normal editing mode of FIG. 1. However, the document page 100 has a fifth floating object that is not visible in FIG. 1 because it is totally obscured by at least one other floating object. FIG. 2 depicts the document page 100 being rendered in one embodiment of the layer editing mode. This mode can be entered by the user selecting the "order all floating objects in document page" on the menu 112. Thus, all of the floating objects 102(*a*)-102(*e*) in the document page 100 are displayed in this example.

In the layer editing mode, the electronic document 100 is depicted as a number of "windows" or "x/y plane slices". Each window 202 corresponds to one position on the z-order stack. In one implementation, the windows 202 are rendered in a way that makes them appear to be panes of glass. Thus, a reason for the choice of the term "window" refers to the ability to see through the window 202 to a lower layer. The windows 202(*a*)-202(*e*) are ordered, lowest layer 202(*e*) to highest layer 202(*a*), going from left to right. In this embodiment, the windows 202 each have a number in their lower left corner to indicate to the user the layer of that window 202. However, the window numbering is not required. Note that window 202(*e*) for the lowest layer contains floating object 102(*e*) that is not visible in the normal editing mode of FIG. 1. The user is allowed to re-order the windows 202 in the layer editing mode in order to re-order the layers of floating objects 102. Further details are discussed below.

In this embodiment, each of the windows 202 are tilted to provide the illusion that the x/y plane of the window 202 is not parallel to the x/y plane of the display screen 791. The angle at which the plane of the windows 202 appear to be angled is a design choice. In some embodiments, the apparent angle of the windows 202 changes in response to user actions.

In the embodiment depicted in FIG. 2, the windows 202 overlap one another to some degree. For example, window 202(*e*) for the lowest layer is partially overlapped by window 202(*d*) for layer 4. As another example, window 202(*c*) is partially overlapped by window 202(*b*). Note that floating object 102(*c*) appears through window 202(*b*) even though window 202(*b*) is at a higher layer than floating object 102(*c*). Thus, the user is allowed to "see through" a window 202 to a lower layer. The windows 202 may have any degree of transparency. For example, by appropriate selection of transparency, the layering of the windows 202 can be made readily apparent while still allowing floating objects 202 to be seen through the windows. For example, the appearance of the rightmost portion of floating object 102(*c*) that is covered by window 202(b) could be altered to illustrate the layering. In one embodiment, the floating objects 102 are outlined with a halo or other effect to help the floating objects 102 to stand out more.

Note that it is not a requirement that the windows 202 be angled at all or that the windows 202 overlap. For example, the windows 202 could appear to be in the same plane as the display screen 791 (i.e., no apparent angle). In such an embodiment, the windows 202 would not overlap, which will allow the user to see the floating objects 102 at the different layers. Even if the windows 202 appear to be angled, it is not an absolute requirement that they overlap. However, overlapping saves space so as to allow many windows 202 to be displayed and also aids the user in understanding the order of the layers.

In some embodiments, the x-y position that the floating objects 102 have in the document 100 is preserved in the windows 202. For example, each of the windows 202 represents the entire x-y area of the document page 100 in this example. Floating object 102(a) appears in window 202(a) in a position that represents (or preserves) the x-y position it had in FIG. 1. A purpose of preserving the x-y position of the floating objects 102 to help the user understand the x-y position of one floating object 102 is relative to another 102 while in the layer editing mode. Note that it is not required that the exact x-y position be preserved. For example, by the use of mathematical equations it is possible to model a position, size, and shape for a floating object 102 for a given apparent angle of a window 202. However, it is not a requirement that the mathematical model be precise in order to provide the desired effect of preserving the x-y position. In other words, different mathematical modeling techniques that result in slightly different positions, sizes, and/or shapes of the floating objects 102 can be used and still achieve the desired effect.

In one embodiment, the floating objects 102 are displayed in a different manner than other objects when in the normal editing mode to help the user identify the floating objects 102. As one example, when the user hovers a mouse cursor over a floating object 102, visual feedback of the floating object 102 is provided. The visual feedback can include, but is not limited to highlighting the boundary of the floating object 102. Note that the boundary of the floating object 102 is not necessarily visible to the user.

Referring again to the document page 100 of FIG. 1, the document page may have other objects than floating objects 102. Typically, these other objects are not displayed in the layer editing mode. However, it is not required that only floating objects 102 be displayed in the layer editing mode.

Figure 3:
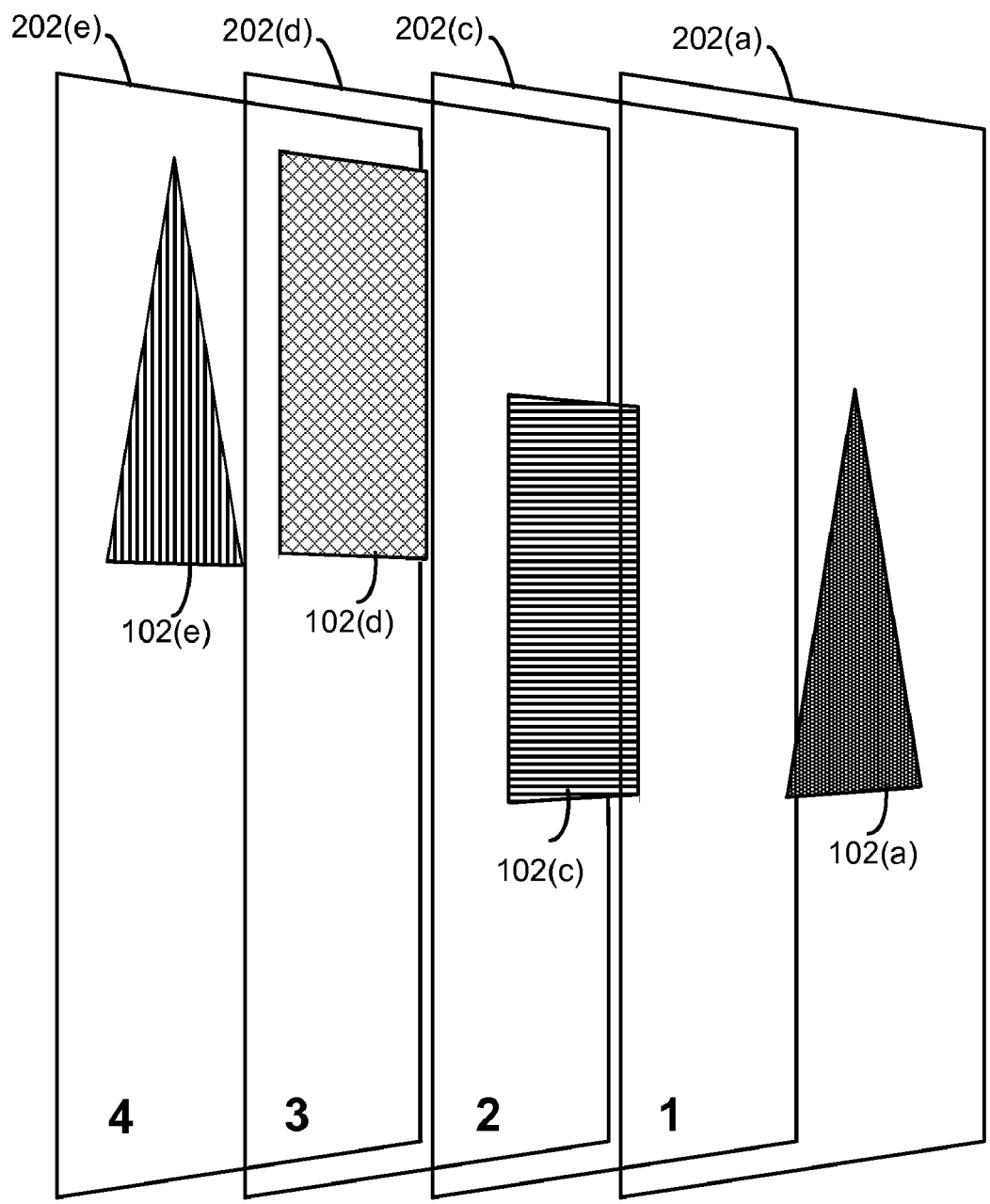
FIG. 3 depicts a document page being rendered in one embodiment of the layer editing mode that displays only a subset of floating objects.

FIG. 3 depicts the document page 100 being rendered in an embodiment of the layer editing mode in which only floating objects 102 in the document page 100 that are associated with floating object 102(d) are displayed. Specifically, floating objects 102(a), 102(c), and (102d), which are in a cluster with floating object 102(d) are displayed. Thus, in this example, the cluster technique is used to determine the overlapping floating objects. Note that other techniques can be used to determine which floating objects 102 overlap. For example, if the direct overlapping technique were used, then only floating objects 102(c), 102(d) and 102(e) would be in the set of overlapping floating objects. Note that still other techniques could be used to determine which floating objects 102 overlap. Moreover, other techniques can be used to determine which floating objects 102 are associated with floating object 102(d). For example, the user might specify a set of related floating objects 102 that do not necessarily overlap.

Figure 4:
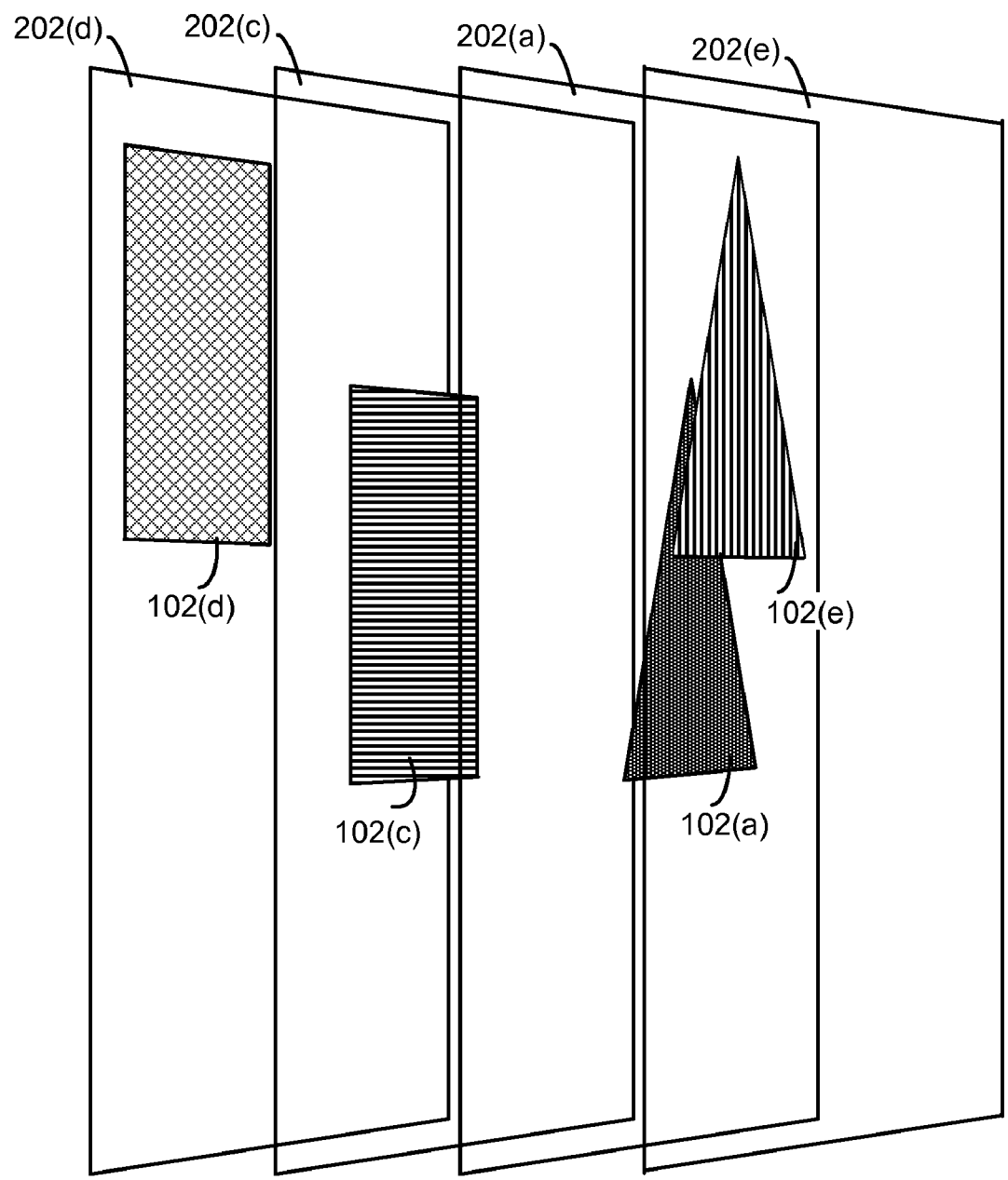
FIG. 4 depicts windows of a document page after re-ordering in the layer editing mode.

FIG. 4 depicts the windows 202 after re-ordering the windows 202 (and hence re-ordering the floating objects 102) per user request. Note that window 202(e) (originally the lowest) is now the highest window (rightmost). The user can continue to re-order the windows 202 as long as the user stays in the layer editing mode. Once the user is satisfied with the window order, the user leaves the layer editing mode.

Figure 5:
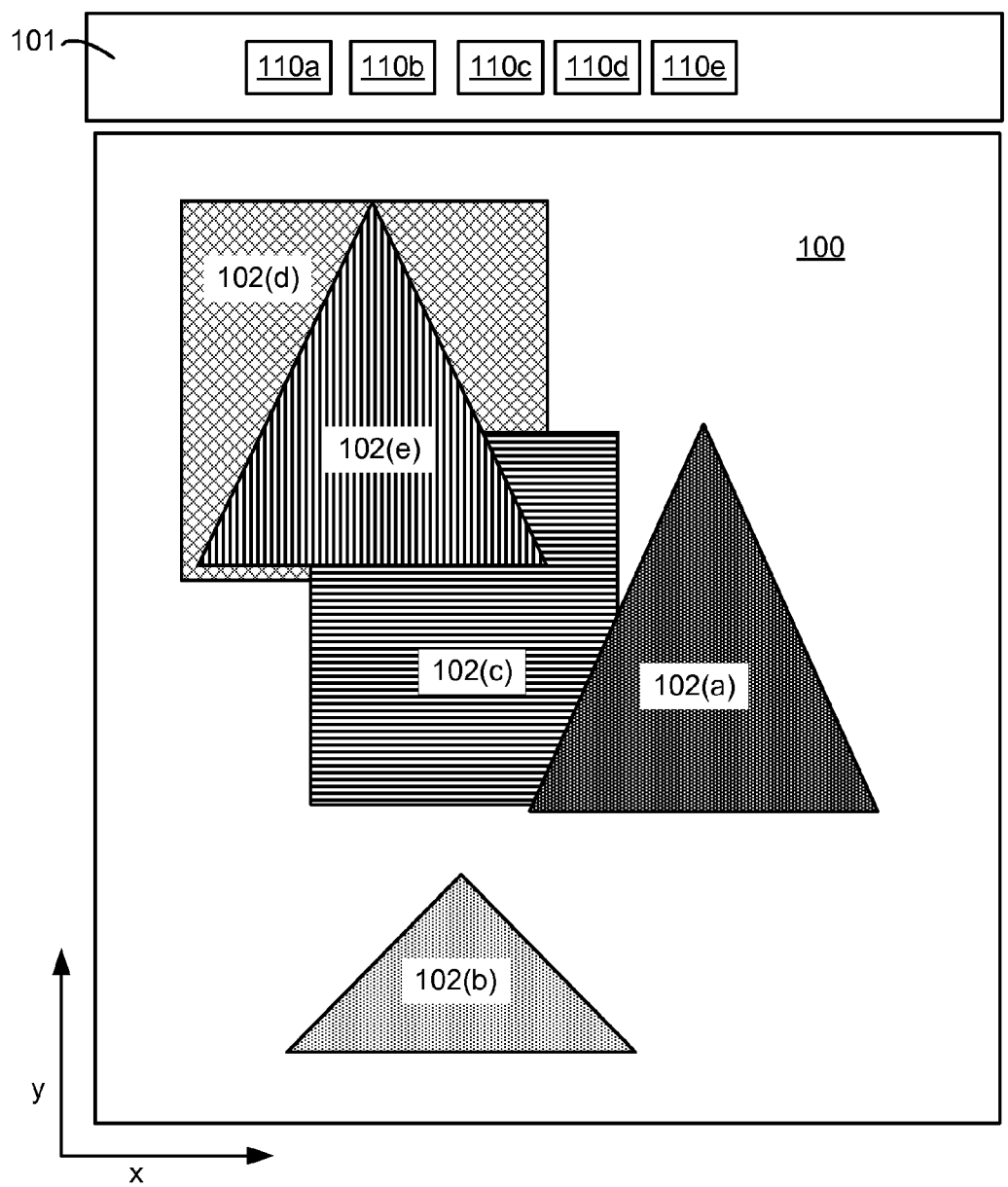
FIG. 5 depicts the document once again displayed in the normal editing mode after re-ordering layers in the layer editing mode.

FIG. 5 depicts the document page 100 once again displayed in the normal editing mode. Now, all five floating objects 102(a)-102(e) can clearly be seen. Note that throughout this process, the user was not required to alter the x-y position of any of the floating objects 102.

Figure 6:
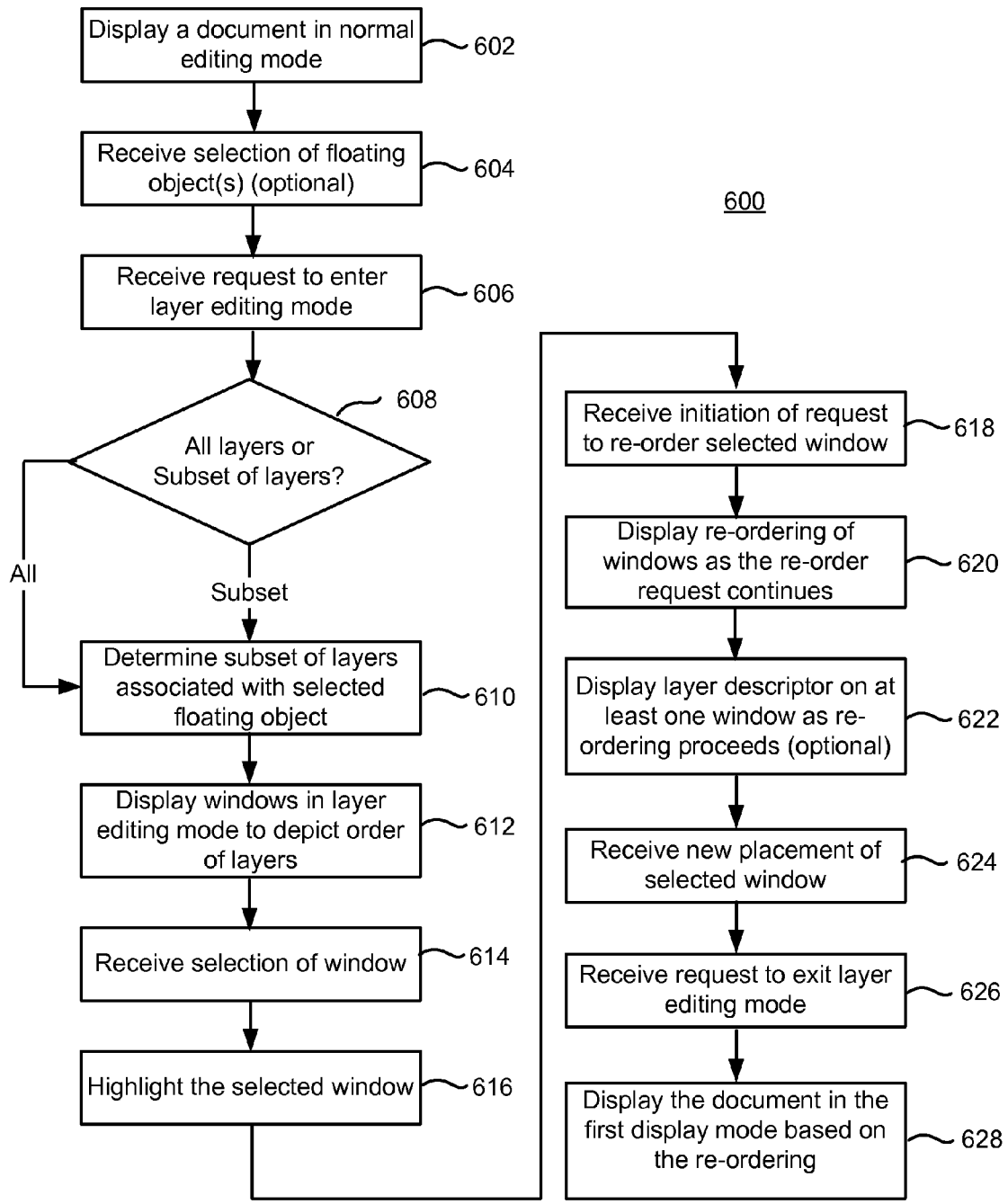
FIG. 6 is a flowchart of one embodiment of a process of re-ordering floating objects in a document.

FIG. 6 is a flowchart of one embodiment of a process 600 of re-ordering floating objects 102 in a document page 100. Process 600 may be implemented by executing instructions, which are stored on a computer readable storage medium, on a processor. The instructions may be a part of a document editing program. In step 602, a document page 100 is displayed in a normal editing mode. FIG. 1 provides one example of a document page 100 displayed in a normal editing mode.

In step 604, a selection of one or more floating objects 102 is received while displaying the document page 100 in the normal editing mode. This step is optional. As an example, a user selects a floating object 102 by moving a cursor over the floating object 102 and "clicking" a mouse button. As another example, a user forms a rectangle around one or more floating objects using the cursor to select one or more floating objects 102. More specifically, the user positions the cursor at a desired location and performs a "mouse click" by holding down a mouse button. Then, while holding down the mouse button, the user moves the cursor to a new location, which causes a rectangle to be displayed based on the cursor position when the mouse was first clicked and the new cursor position. In one aspect, a floating object 102 that does not visibly appear may be selected with other techniques. For example, by a user selecting a certain key on the keyboard, an outline of a floating object 102 that is otherwise obscured appears. The user can then select that floating object 102 with one of the preceding techniques, for example. Other techniques can be used to select visible or obscured floating object(s) 102.

In step 606, a request to enter a special layer editing mode is received. One technique for allowing a user to select the layer editing mode is to provide an icon 110 on a toolbar. FIG. 1 depicts an example of such a toolbar 101. In one embodiment, after the user selects the layer editing mode, the user is provided a choice of whether the layer editing mode should involve all floating objects or only a subset of the floating objects that are associated with a selected floating object (or selected floating objects). In one embodiment, the subset is based on whether the floating objects overlap. For example, a drop down menu appears below the icon 110b having a selection of "order all floating objects in page" and "order floating objects overlapping selected object". In another embodiment, the subset is based on a factor other than whether floating objects overlap. For example, a subset of floating objects such as a boy, his dog, and a basketball could be associated together by the user even though they do not overlap.

In one aspect, the icon 110b to enter the layer editing mode is only selectable if there are at least two floating objects 102 in the document page 100. The user may be informed that the layer editing mode is not selectable by "graying out" the icon 110b. In one aspect, the menu 112 only list options that are possible for the given document page 100. For example, if the user has not selected at least one floating object 102 in step 603, then the "order floating objects overlapping a selected object" mode is not selectable.

Another technique for entering the editing mode is based on the user directly selecting one of the floating objects 102.

In one aspect, this technique is only available if floating objects 102 are associated with each other in some manner. In one aspect, the association is that there are overlapping floating objects 102 in the document page 100. The following discussion is based on an example in which the association between the floating objects is that they are overlapping. If the user selects a floating object 102 that overlaps another floating object 102, then an "on object user interface" (OOUI) is displayed. For example, an icon similar to icon 110*b* is displayed somewhere near (or over) the selected floating object 102. If the user selects (e.g., mouse clicks) the OOUI, then the application enters the layer editing mode in the same way it would if the user had selected the menu item 112. For example, referring to FIG. 1, if the user selects any of objects 102(*a*), 102(*c*), or 102(*d*), then the OOUI is displayed. Also note that although object 102(*e*) is not visible in the normal editing mode (FIG. 1), in some embodiments object 102(*e*) may still be selected in the normal editing mode. Note that other techniques can be used to cause the OOUI to be displayed.

The process 600 then branches in step 608 depending on whether the user has selected to edit all floating objects 102 or only a subset of floating objects 102. If only a subset of floating objects 102 are to be edited, then a determination is made as to which floating objects 102 should be in the subset, in step 610. For example, a determination is made as to which floating objects 102 overlap with the selected floating object(s) 102. Two techniques for determining overlapping floating objects 102 have already been discussed. One technique is to determine floating objects that directly overlap the selected floating object(s). Another technique is to determine floating objects that form a cluster with the selected floating object(s). Also note that the subset of floating objects 102 can be associated with the selected floating object 102 in a manner other than being overlapping. Examples have been provided of the user specifying a set of associated floating objects 102. After step 610, control passes to step 612.

If all floating objects 102 are to be displayed in the layer editing mode, then control goes from step 608 to step 612. In step 612, windows 202 are displayed in the layer editing mode. FIGS. 2 and 3 depict two examples of displaying windows 202 in the layer editing mode. Displaying the windows 202 involves preserving the x-y position of the floating objects 102 in the document page 100, in some embodiments. Preserving the x-y position has been discussed above.

In step 614, a selection of a window 202 to be moved is received. For example, the user places a cursor over window 202(*e*) and either "right clicks" or "left clicks" the mouse to select the window 202(*e*). However, another technique can be used to select a window 202(*e*).

In step 616, the selected window 202(*e*) is highlighted. For example, window 202(*e*) moves forward in a "pop-up effect", a halo or other effect might be displayed around the selected window 202(*e*), the window 202(*e*) could be made brighter, the color of window 202(*e*) could be altered, etc.

In step 618, a request to re-order the selected window 202(*e*) is received. In one embodiment, the request takes the form of a user "dragging" a window 202 with a mouse cursor. For example, the user places a cursor over window 202(*e*) and either "right clicks" or "left clicks" the mouse to select the window 202(*e*). Once the window 202(*e*) has been selected, the user drags the window 202(*e*) to a new location by moving the cursor. Dropping the window 202(*e*) into a new position occurs later in the process 600 (see step 624). Other techniques can be used to move a window 202.

Figure 7:
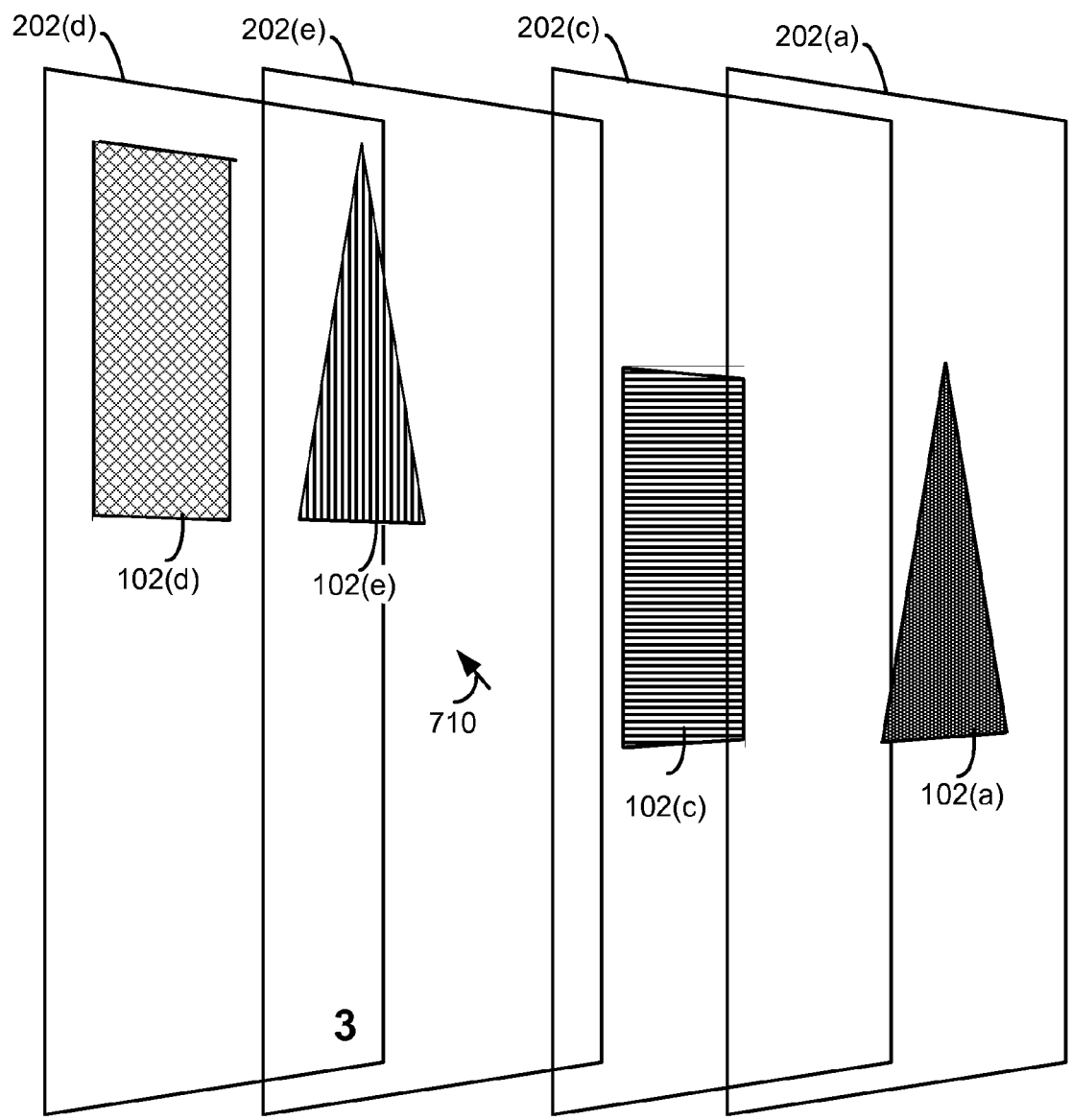
FIG. 7 depicts windows of a document page during re-ordering in the layer editing mode.

In step 620, the re-ordering of the windows 202 is displayed as re-ordering is in progress. For example, as the user is dragging the window 202(*e*) the appearance of the windows 202 is altered to provide the user with visual cues. One type of visual cue is to alter the spacing between the windows 202(*e*). A particular example of which is to have a wider gap between windows 202 in the vicinity of the selected window 202(*e*). FIG. 7 depicts an example in which selected window 202(*e*) has now been moved to a position between windows 202(*c*) and 202(*d*). In this embodiment, a cursor 710, which the user employs to drag the selected window 202(*e*), is depicted over the selected window 202(*e*). Note that the wide gap between windows 202(*c*) and 202(*d*) can aid the user in dropping window 202(*e*) in that gap, if desired. If there are many windows 202, then other gaps can be adjusted also. For example, if the selected window is in layer 6 out of 11 windows, then the gaps between windows at layers 5 and 7 is the widest, layers 4 and 8 is the next widest, layers 3 and 9 are the next widest, etc. In one implementation, the distribution of widths approximates a Gaussian distribution.

Another technique that can be used to provide the user with visual cues is to alter the color or transparency of the windows 202 as the user drags the selected window 202(*e*). As a specific example the transparency of the selected window 202(*e*) is reduced, which may make the selected window 202(*e*) stand out more as windows 202 (and their floating objects 102) beneath the selected window 202(*e*) are not seen as clearly.

In step 622, a layer descriptor is displayed on at least one window 202 as the re-ordering continues. For example, the numeral "3" is placed in the lower left hand corner of the selected window 202(*e*) in FIG. 7 to indicate that window 202(*e*) is now at the third layer. Note that as window 202(*e*) is dragged from left to right the numeral progressively becomes lower to provide the user with additional visual feedback as to the current layer. If desired, numerals can be placed on one or more other windows 202. In one aspect, numerals are placed on more than one window 202, but the numerals are presented in a manner than emphasizes the selected window 202(*e*). For example, the numeral on the selected window 202(*e*) is bright, whereas the numeral one or more other windows 202 is dimmer. In one aspect only a limited number of the windows 202 (e.g., those that the selected window 202(*e*) just passed over) have a numeral. Other alternatives for the numerals are possible.

In step 624, a final placement for the selected window 202(*e*) is received. As an example, the user releases the mouse button to drop the window 202(*e*) into place. FIG. 4 shows the result after the selected window 202(*e*) has been placed into a new position.

In step 626, as request to leave the layer editing mode is received. In one aspect the layer editing mode is exited by the user mouse clicking on any area outside of the windows 202. Another technique for exiting the layer editing mode is the user pressing the escape key that is typically found on computer keyboards. Other techniques can be used to exit the layer editing mode.

In step 628, the document page 100 is displayed in the normal editing mode once again. FIG. 5 depicts results after step 628.

Figure 8:
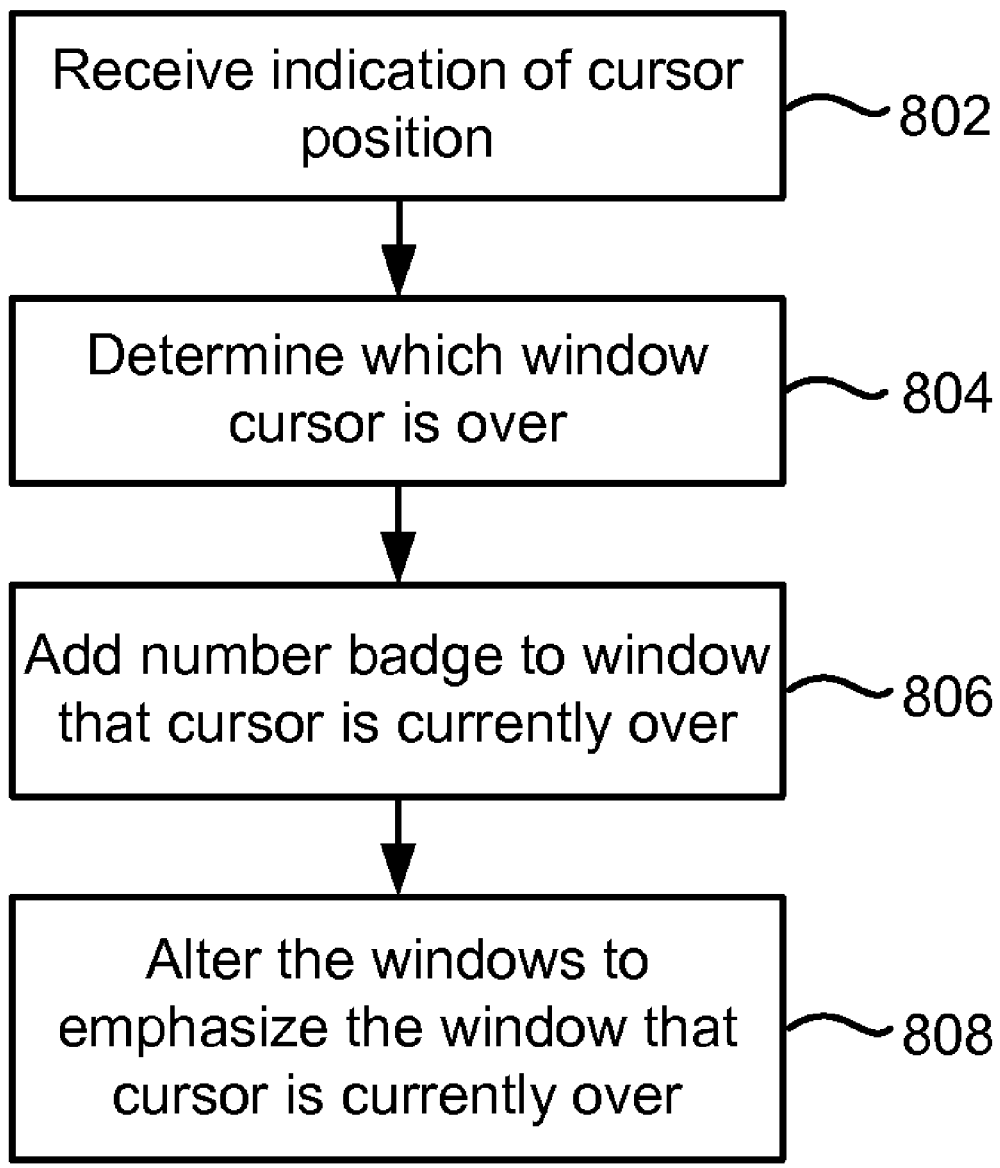
FIG. 8 is a flowchart of one embodiment of a process of displaying windows in a layer editing mode.

FIG. 8 is a flowchart of one embodiment of a process 800 of displaying windows 202 in a layer editing mode. In process 800, the windows 202 are not re-ordered. This process 800 may be used to help the user to preview the order of the floating objects 102 prior to re-ordering them. Process 800 occurs as a user is moving a cursor over the windows 202. In step 802, an indication is received as to the current cursor position. In step 804, a determination is made as to which window 202 the cursor is currently over. In step 806, a descriptor of the layer is added to the window 202 that the cursor is currently over. For example, a number is added to the window 202. Step 622 of process 600 describes some techniques for adding descriptors to windows 202. In step 808, the windows 202 and/or their spacing is altered to emphasize the window the cursor is currently over, which may aid the user in understanding the floating object layering. Step 620 of process 600 describes some techniques such as altering the gap between windows 202 that can also be used in step 808. Also, the color or transparency of windows 202 can be altered.

In one embodiment, the user is able to "tag" a window 202 while in the layer editing mode such that the floating object 102 in the window 202 has special properties when returning to the normal editing mode. A possible use of this function is to help the user to edit the tagged floating object in the normal mode. For example, a floating object might be at a low layer such that it is totally or partially obscured by other floating objects. Thus, the user might have a difficult time editing it in the normal mode. After tagging the floating object 102 in the layer editing mode and returning to the normal mode, the floating object 102 stays at its original layer (assuming the user did not otherwise re-order the floating objects). However, in the normal mode the tagged floating object 102 has "gems" depicted at the corners of the object 102 to make its location readily apparent to the user. The user can now select the floating object 102 for editing in the normal editing mode without moving its layer.

Figure 9:
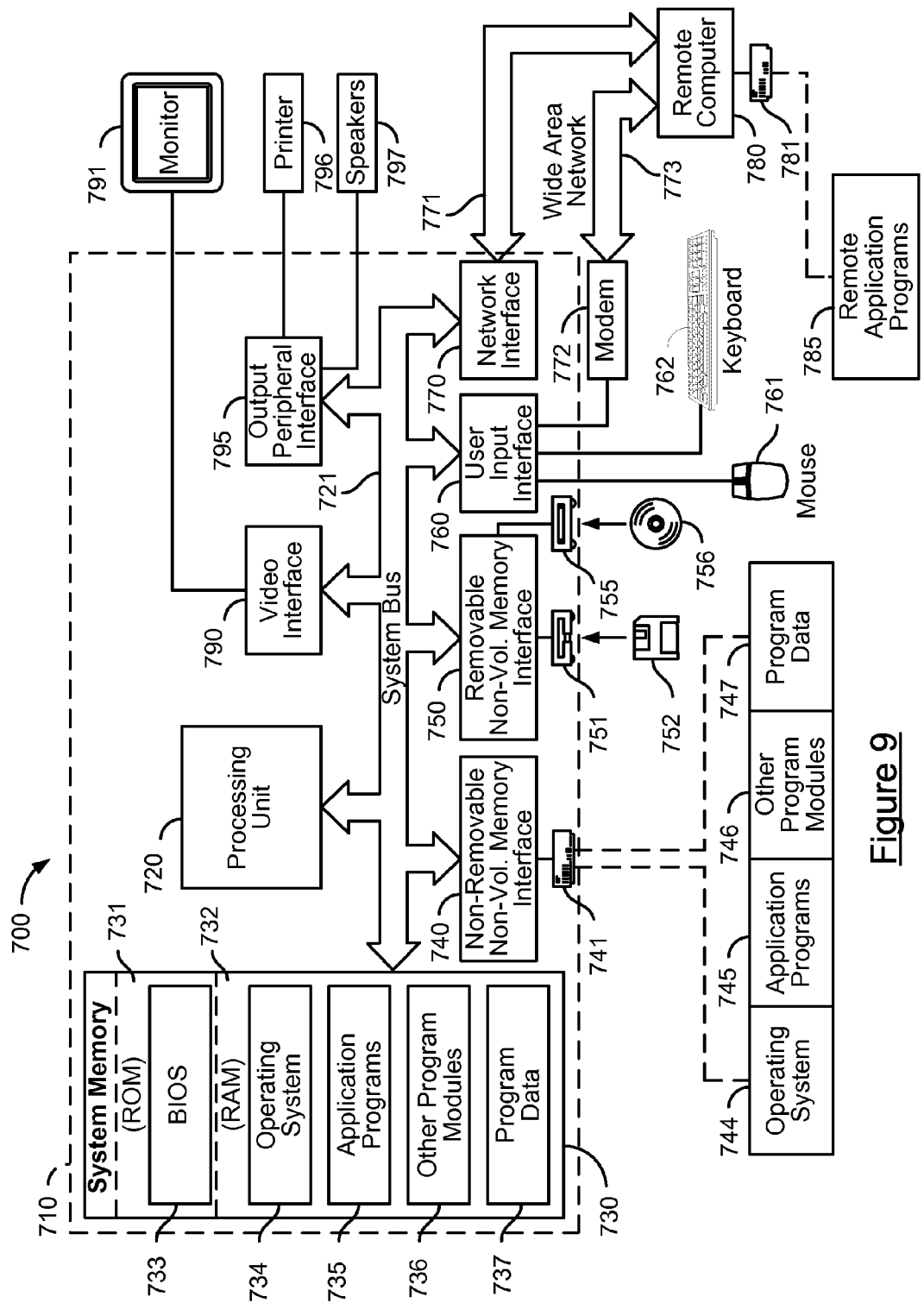
FIG. 9 depicts an example computer system that serves as a platform for embodiments of the present invention

With reference to FIG. 9, an exemplary system for implementing the inventive system includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

In one embodiment, to implement process 600 and/or process 800 computer readable instructions that are stored on computer readable media are executed on a processor. Computer 910 may include a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes volatile and nonvolatile, as well as removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other storage medium which can be used to store the desired information and which can be accessed by computer 910. Communication media typically embodies computer readable instructions, data structures, program modules or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as radio frequency and other wireless media. Combinations of any of the above are also included within the scope of computer readable media.

The system memory 930 includes computer storage media in the form of volatile and/or nonvolatile memory such as ROM 931 and RAM 932. A basic input/output system (BIOS) 933, containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disc drive 941 that reads from or writes to non-removable, nonvolatile magnetic media and a magnetic disc drive 951 that reads from or writes to a removable, nonvolatile magnetic disc 952. Computer 910 may further include an optical media reading device 955 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 941 is typically connected to the system bus 921 through a non-removable memory interface such as interface 940. Magnetic disc drive 951 and optical media reading device 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disc drive 941 is illustrated as storing operating system 944, application programs 945, other program modules 946, and program data 947. These components can either be the same as or different from operating system 934, application programs 935, other program modules 936, and program data 937. Operating system 944, application programs 945, other program modules 946, and program data 947 are given different numbers here to illustrate that, at a minimum, they are different copies.

A user may enter commands and information into the computer 910 through input devices such as a keyboard 962 and a pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus 921, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communication over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communication link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer implemented method comprising:
    displaying at least a portion of an electronic document in a first mode, the portion of the electronic document comprises a plurality of floating objects, the portion of the electronic document has a z-order stack, each floating object has an x-y location in the portion of the electronic document and has a position in the z-order stack, in the first mode the floating objects are displayed in an x-y plane based on the z-order stack;
    displaying the portion of the electronic document in a second mode, in the second mode the electronic document is depicted as a plurality of x-y plane slices, each x-y plane slice corresponds to one position on the z-order stack and depicts the floating object that is associated with that position on the z-order stack, each x-y plane slice having a number indicator that specifies the position on the z-order stack that the floating object for that x-y plane slice is in, the x-y plane slices are displayed partially overlapping in a particular order to depict the position of the floating objects on the z-order stack, displaying the portion of the electronic document in a second mode includes displaying only a subset of the floating objects that are included in the portion of the electronic document;
    receiving a request to re-order the x-y plane slices when in the second mode, receiving the request to re-order includes receiving a request to move a first x-y plane slice relative to the other x-y plane slices;
    displaying a re-ordering of the x-y plane slices based on the request to re-order, the displaying a re-ordering includes displaying the first x-y plane slice moving relative to the other x-y slices, the displaying includes decreasing the amount of overlap displayed between neighboring x-y plane slices that the first x-y plane slice is near as it is being moved, the displaying including updating the number indicator on the first x-y plane slice that indicates the current position on the z-order stack for the first x-y plane slice, the number is updated as the first x-y slice is being moved to specify the relative position of the first x-y plane slice to the other x-y plane slices; and
    displaying the portion of the electronic document in the first mode based on the re-ordering of the x-y planes slices.

2. A computer implemented method as recited in claim 1, further comprising determining the subset by determining which of the floating objects overlap a first floating object.

3. A computer implemented method as recited in claim 1, further comprising determining the subset by determining which of the floating objects were identified by a user as associated with a first floating object.

4. A computer implemented method as recited in claim 1, wherein the displaying the portion of the electronic document in a second mode includes preserving the x-y location in the portion of the electronic document of each floating object in the subset.

5. A computer implemented method as recited in claim 1, further comprising:
    receiving a request to store an indication that a first floating object of the floating objects is to be displayed without being obscured by other floating objects when in the first mode, the request is received when in the second mode; and
    wherein displaying the portion of the electronic document in the first mode based on the re-ordering includes displaying the first floating object to allow the first floating object to be viewed for editing by the user, the first floating object would be otherwise be obscured in the first mode.

6. A computer implemented method as recited in claim 1, further comprising:
    receiving an indication of a position of a cursor as the cursor moves across the x-y plane slices; and
    highlighting the x-y plane slice that the cursor is currently over as the cursor moves.

7. The method of claim 1, wherein the displaying includes displaying a progressively narrower gap between x-y plane slices further from the first x-y plane slice, the distribution of gap widths approximates a Gaussian distribution.

8. The method of claim 1, wherein the displaying includes displaying a progressively narrower gap between x-y plane slices further from the first x-y plane slice, the x-y plane slices include second, third and fourth x-y plane slices that are in progressively higher layers of the z-order stack, the progression has a large gap between the first x-y plane slice and the second x-y place slice, an intermediate size gap between the second x-y plane slice and the third x-y place slice, and a small gap between the third x-y plane slice and the fourth x-y place slice.

9. A computer implemented method comprising:
    displaying a page of an electronic document in a first mode, the electronic document page comprises a plurality of floating objects and a plurality of ordered layers, each floating object has an x-y location in the electronic document page, each floating object is associated with one of the layers, in the first mode the floating objects are displayed in a single x-y plane based on the order of the layers;

receiving a selection of a first floating object while displaying the electronic document page in the first mode;

determining a subset of floating objects that are associated with the first floating object, the subset of floating objects are associated with a subset of the layers;

displaying the electronic document page in a second mode, in the second mode the electronic document page is depicted as a plurality of transparent slices that partially overlap, each of the slices corresponds to a layer of the subset of layers, the slices overlap in a first order to depict the relative order of the subset of layers, each of the slices contains a floating object depicted in the x-y location in the electronic document page for the floating object, the transparent slices are displayed as panes of glass, each transparent slice having a number indicator that specifies what layer the floating object for that transparent slice is in;

receiving a request to re-order the slices when in the second mode, receiving the request includes receiving a request to drag a first slice of the slices to a new location among the slices;

displaying the first slice in different positions relative to the other slices in response to the request to re-order the slices, the displaying the first slice in different positions includes altering the overlap between the slices to provide visual cues as the first slice is being dragged, the displaying includes displaying a progressively narrower gap between slices further from the first slice, the distribution of gap widths approximates a Gaussian distribution;

receiving an indication that the first slice is in a final position, the receiving the indication includes receiving a request to drop the first slice at the new location, the slices are in a final order when the first slice is in the final position; and displaying the electronic document page in the first mode based on the final order of the slices.

10. A computer implemented method as recited in claim 9, wherein the displaying the first slice of the slices in different positions relative to the other slices includes displaying a position indicator on the first slice, the position indicator specifies what position the first slice occupies relative to the other slices as the first slice is being dragged and prior to being dropped.

11. A computer implemented method as recited in claim 9, further comprising determining the subset by determining which of the floating objects overlap the first floating object.

12. A computer implemented method as recited in claim 9, further comprising determining the subset by determining which of the floating objects were identified by a user as associated with the first floating object, the identified floating objects are associated with layers of the plurality of ordered layers other than the layer with which the first floating object is associated.

13. A computer implemented method as recited in claim 9, wherein the displaying the electronic document page in a second mode includes preserving the x-y location in the electronic document page of each floating object.

14. A computer implemented method as recited in claim 9, further comprising:

receiving a request to store an indication that the first floating object is to be displayed without being obscured by other floating objects when in the first mode, the request is received when in the second mode; and wherein the displaying the electronic document page in the first mode based on the final position of the first slice and positions of the other slices includes displaying the first floating object to allow the first floating object to be viewed for editing by the user, the first floating object would be otherwise be obscured in the first mode.

15. A computer storage medium having stored thereon instructions which, when executed on a processor, implement a method comprising:

displaying a page of an electronic document in a first mode, the document page comprises a plurality of floating objects and a plurality of layers, each floating object has an x-y location in the document page, each floating object is associated with one of the layers, in the first mode the floating objects are displayed in a single x-y plane based on the order of the layers, the first mode allows editing characteristics of the floating objects;

providing an option for a user to request that all of the floating objects be displayed in a layer editing mode or that only floating objects that overlap a selected floating object be displayed in the layer editing mode;

receiving a request to display the document page in the layer editing mode, the layer editing mode allows changing the layer that a floating object is in but does not allow changing other characteristics of the floating objects, the request is one of displaying all floating objects or only displaying floating objects that overlap a selected floating object;

determining a set of the floating objects to display in the layer editing mode to satisfy the request, the set of the floating objects are associated with a set of the layers;

displaying the document page in the layer editing mode, the layer editing mode depicts the document page as a plurality of windows, each window corresponds to a layer of the set of layers, the windows partially overlap each other in an order that corresponds to the relative order of the set of layers, each of the windows contains a floating object depicted in the x-y location in the document page for that floating object, the windows are transparent to allow a particular floating object to be seen through any windows that overlap the window containing the particular floating object, the windows are displayed as panes of glass each having a number indicator that specifies what layer the floating object for that window is in;

receiving a request to re-order the windows when in the layer editing mode, receiving the request includes receiving a request to drag a first window of the windows to a new location;

displaying the first window in different positions relative to the other windows in response to the request to drag the first window to the new location, the displaying the first window includes updating the number indicator on the first window as the first window is being dragged to highlight the position the first window is in relative to the other windows, the displaying the first window includes displaying a progressively narrower gap between windows further from the first window, the distribution of gap widths approximates a Gaussian distribution;

receiving an indication that the first window is in a final position, the receiving the indication includes receiving a request to drop the first window at the new location; and receiving a request to display the document page in the first mode, the request to display the document page in the first mode is received when the first window is in the final position, the windows are in a final order when the first window is in the final position; and displaying the document page in the first mode in response to the request to display the document page in the first mode, the displaying the document page in the first mode is based on the final order of the windows.

16. A computer storage medium as recited in claim 15, wherein the determining a set of the floating objects to display in the layer editing mode includes determining a set of the floating objects in layers other than the layer in which the selected floating object is in that form a cluster with the selected floating object.

17. A computer storage medium method as recited in claim 15, wherein the determining a set of the floating objects to display in the layer editing mode includes determining a set of the floating objects in layers other than that directly overlap the selected floating object.

18. A computer storage medium as recited in claim 15, wherein the displaying the object in a layer editing mode includes preserving the x-y location in the document page of each floating object.

19. A computer storage medium as recited in claim 15, wherein the receiving a request to display the document page in the layer editing mode includes receiving a request to display only floating objects that overlap a selected floating object.

* * * * *